United States Patent Office 3,446,098
Patented May 27, 1969

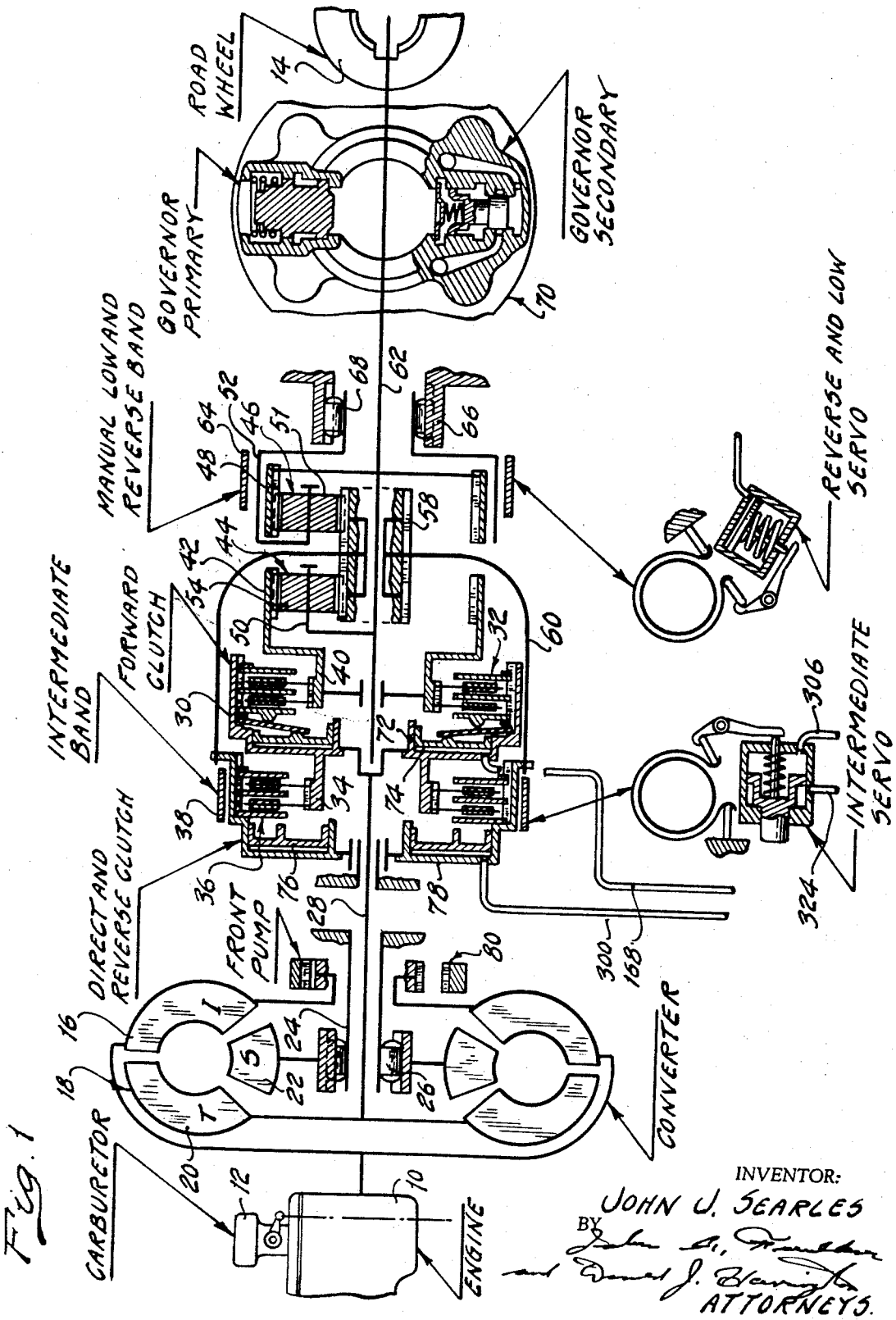

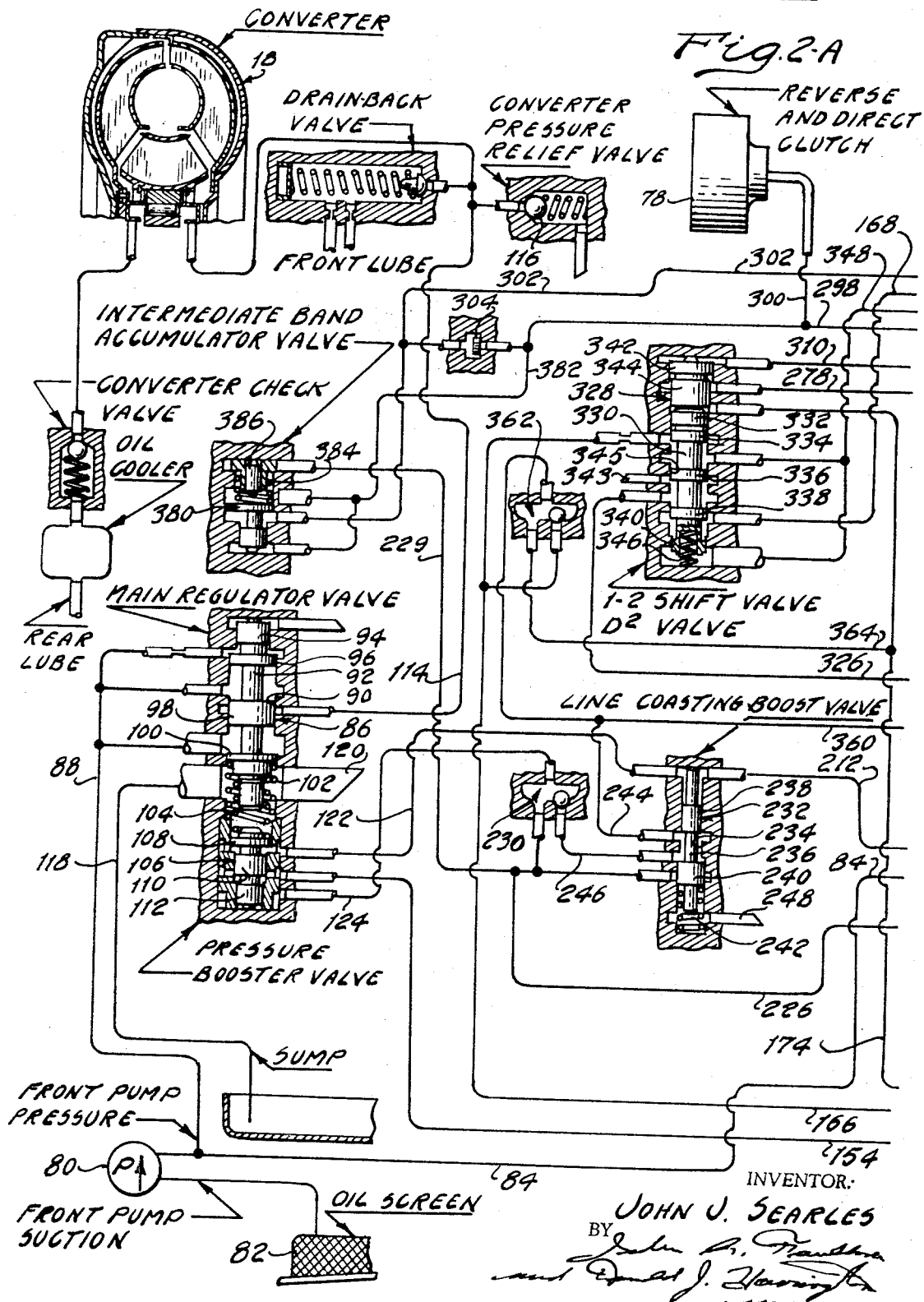

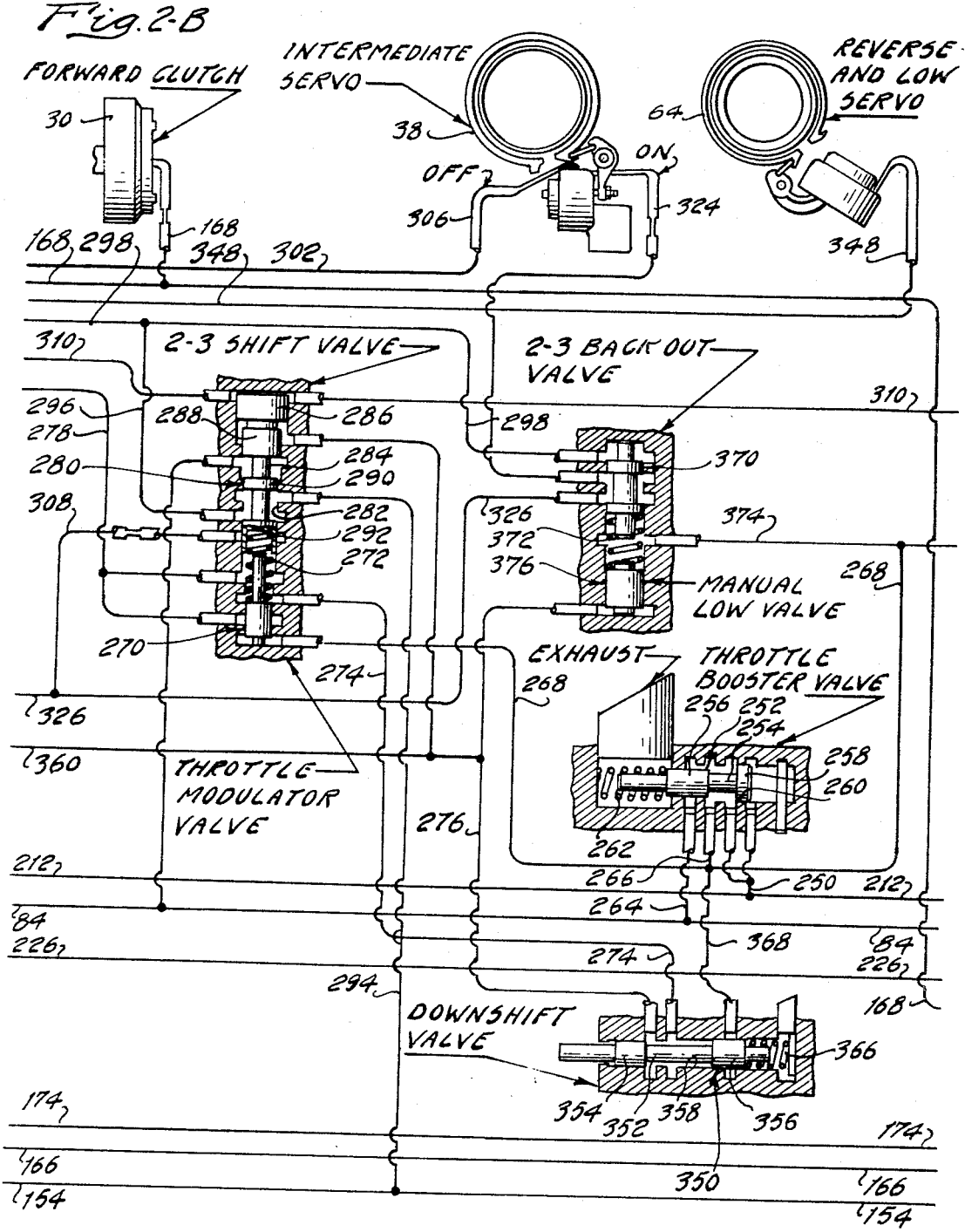

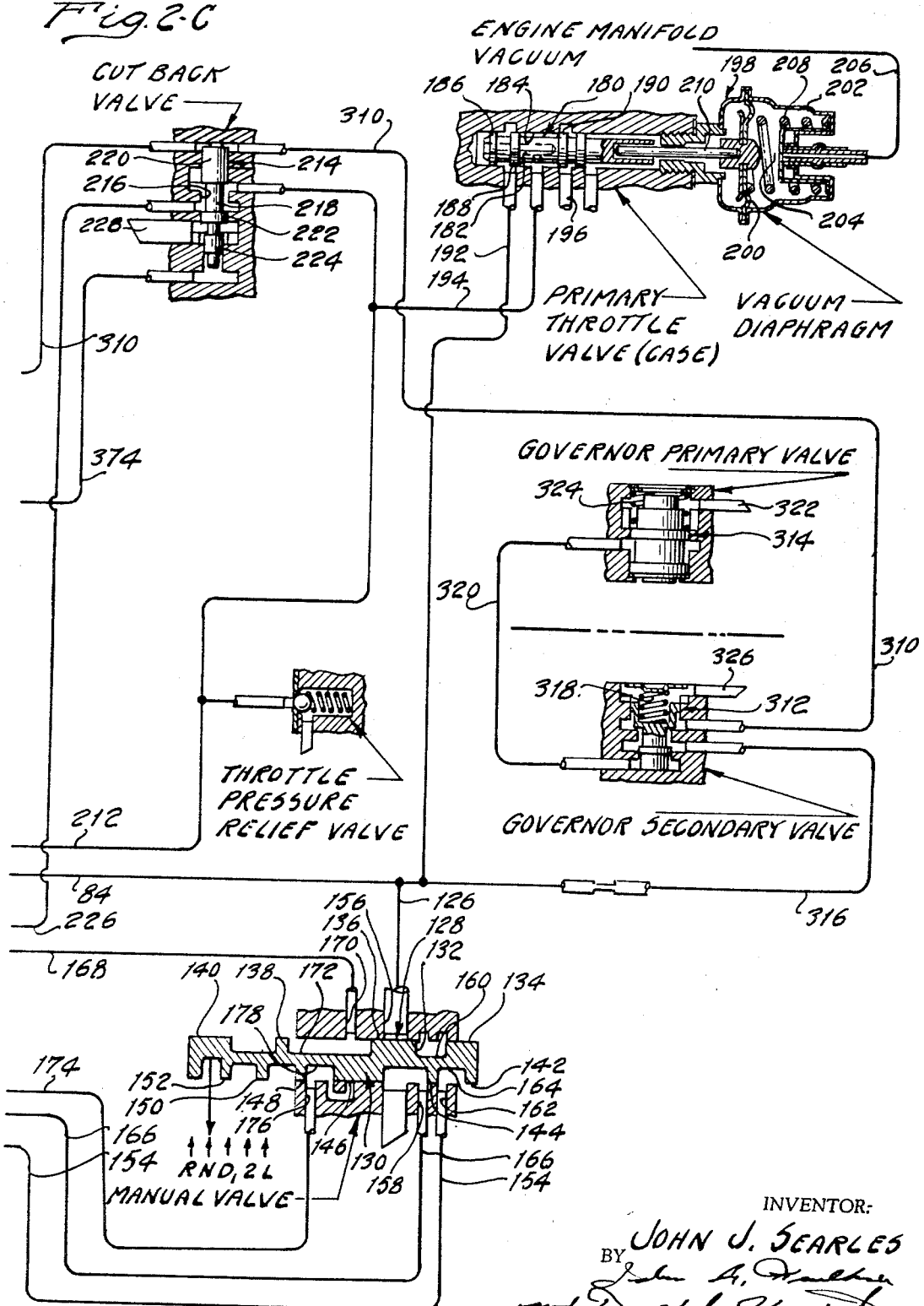

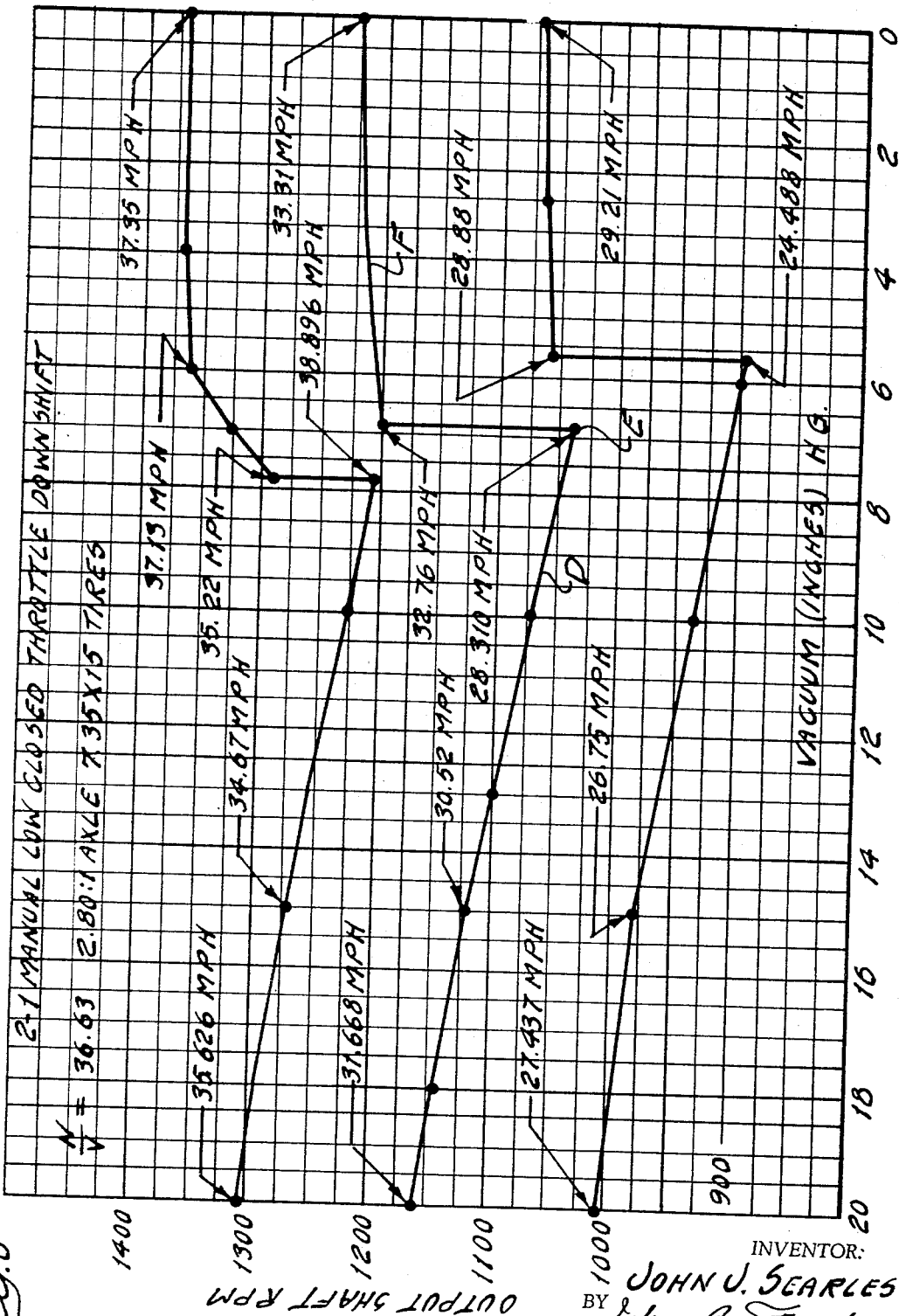

---

3,446,098
AUTOMATIC POWER TRANSMISSION MECHANISM WITH DUAL RANGE DRIVE CONTROLS
John J. Searles, Northville, Mich., assignor to Ford Motor Company, Dearborn, Mich., a corporation of Delaware
Filed Apr. 3, 1967, Ser. No. 627,922
Int. Cl. F16h *39/50*
U.S. Cl. 74—869                           18 Claims

ABSTRACT OF THE DISCLOSURE

A control valve system for an automatic power transmission mechanism comprising pressure operated control servos, a pressure source, circuitry including a line pressure coasting boost valve for maintaining a proper circuit pressure regardless of changes in operating torque, and a downshift regulating valve cooperating with the boost valve for establishing proper automatic downshift points during coasting without influencing adversely the automatic upshift points during normal acceleration.

Brief summary of the invention

This invention relates generally to automative vehicle drivelines having a hydrokinetic torque converter and planetary gearing, the latter establishing multiple torque ratios that are available at various times during the acceleration period of the vehicle. The speed ratios are obtained by fluid pressure operated clutches and brakes that control the degree of relative motion of the elements of the gearing.

In the particular embodiment disclosed in this application there are three forward driving speed ratios available as well as a single reverse speed ratio. Power input to the gearing is accomplished by a hydrokinetic torque converter, the impeller of which is connected to an internal combustion engine having an air-fuel mixture intake manifold. The turbine of the hydrokinetic torque converter is connected to the input elements of the gearing by selectively engageable clutches.

Selectively engageable friction brakes and the aforementioned clutches are applied and released in sequence by fluid pressure operated servos to establish ratio changes. The pressure source for the servos is a positive displacement pump driven by torque delivery elements of the transmission mechanism. An automatic control valve system, including ratio changing shift valves, controls distribution of fluid pressure from the pump to the servos.

The mode of operation of the control valve system is established by a manual valve that is under the control of the vehicle operator. When the manual valve is moved to one forward drive range position, the control valve system is adapted to establish automatic ratio changes in response to control variables such as engine manifold pressure and vehicle speed. When it is moved to the second drive range position, the control valve system is conditioned for operation continuously in the intermediate speed ratio and automatic ratio changes in the control system are not available. When the manual valve assumes a so-called low range position, the transmission mechanism is conditioned for operation in the lowest speed ratio, and automatic upshifts again are not available.

The mechanism is conditioned for reverse drive or for neutral by positioning the manual valve in either of two other operating positions. The manual valve routes fluid pressure from the pump to one region of the control circuit or another depending upon the mode of operation that is desired. In this way semiautomatic ratio changes may be made, when this is desired by the vehicle operator. In an alternative, purely automatic ratio changes are accomplished by moving the manual valve to the previously described first drive range position.

The automatic upshifting tendencies for the 2–3 shift valve system that normally would exist are prevented when the manual valve is conditioned for continuous operation in the intermediate speed ratio. This is done by connecting hydraulically the 1–2 shift valve with the 2–3 shift valve so that a pressure signal is made available to the 2–3 shift valve through the 1–2 shift valve only after the 1–2 shift valve is moved from the downshift position to the upshift position. This arrangement has a further advantage in that the 2–3 shift valve will function only after the 1–2 shift valve functions so that a proper shift sequence is assured.

The provision of both semiautomatic and automatic control features in a system of the type above set forth is an object of my invention.

When the manual valve is shifted to either the intermediate speed ratio drive range or to the low speed ratio drive range, it is desirable to provide an augmentation of the circuit pressure in order to maintain clutch and brake capacity during coasting. The control system includes a main pressure regulator valve that functions to maintain the proper control pressure made available by the pump.

This valve is made sensitive to engine manifold pressure so that proper shift points and adequate servo capacity are established. But since the manifold pressure value is very low during coasting as the engine carburetor throttle is relaxed, there is a normal tendency for the regulator valve to reduce the pressure to a value that usually would be inadequate to maintain brake capacity during coasting. For this reason an augmentation of the pressure level is obtained through the use of a line coasting boost valve which senses engine manifold pressure and which maintains at least a minimum circuit pressure in the system. According to a further object of my invention, the line coasting boost valve is adapted to modify the response of the main regulator valve to changes in engine manifold vacuum so that the main regulator valve will produce a resultant output pressure in the system that is sufficient to maintain clutch and brake capacity but which will avoid excessive clutch and brake servo pressure. In this way proper shift points are maintained and the calibration of the control system in other respects is not upset because of the line pressure boost. Thus the line pressure boost requirements during coasting are achieved without upsetting the desired line pressure variations that are necessary for ratio changes in other driving modes.

If the vehicle operator moves the manual valve to the low range position when the vehicle is traveling at a speed in excess of a predetermined value, the transmission mechanism will shift to the intermediate speed ratio position. An automatic 2–1 downshift then will occur after the vehicle speed falls below the predetermined value. The speed or shift point at which the 2–1 downshift occurs should be maintained at a relatively constant value regardless of whether the shift occurs at a minimum manifold pressure or at a manifold pressure corresponding to an intermediate carburetor throttle setting. The improved valve arrangement of my invention provides a proper automatic 2–1 downshift point under these conditions. I have provided also a pressure relay feature in the line coasting boost valve which will prevent an undesirable buildup in circuit pressure that normally would tend to retard the 2–1 automatic downshift.

Brief description of the figures of the drawings

FIGURE 1 is a schematic drawing of a transmission system capable of embodying the improved control system of my invention;

FIGURES 2A, 2B and 2C show a schematic diagram of a portion of the valve circuit for controlling the clutch and brake servos of the transmission structure of FIGURE 1;

FIGURE 6 is a chart showing the low range, 2–1 downshift points during coasting.

*Particular description of the invention*

Figure 3:
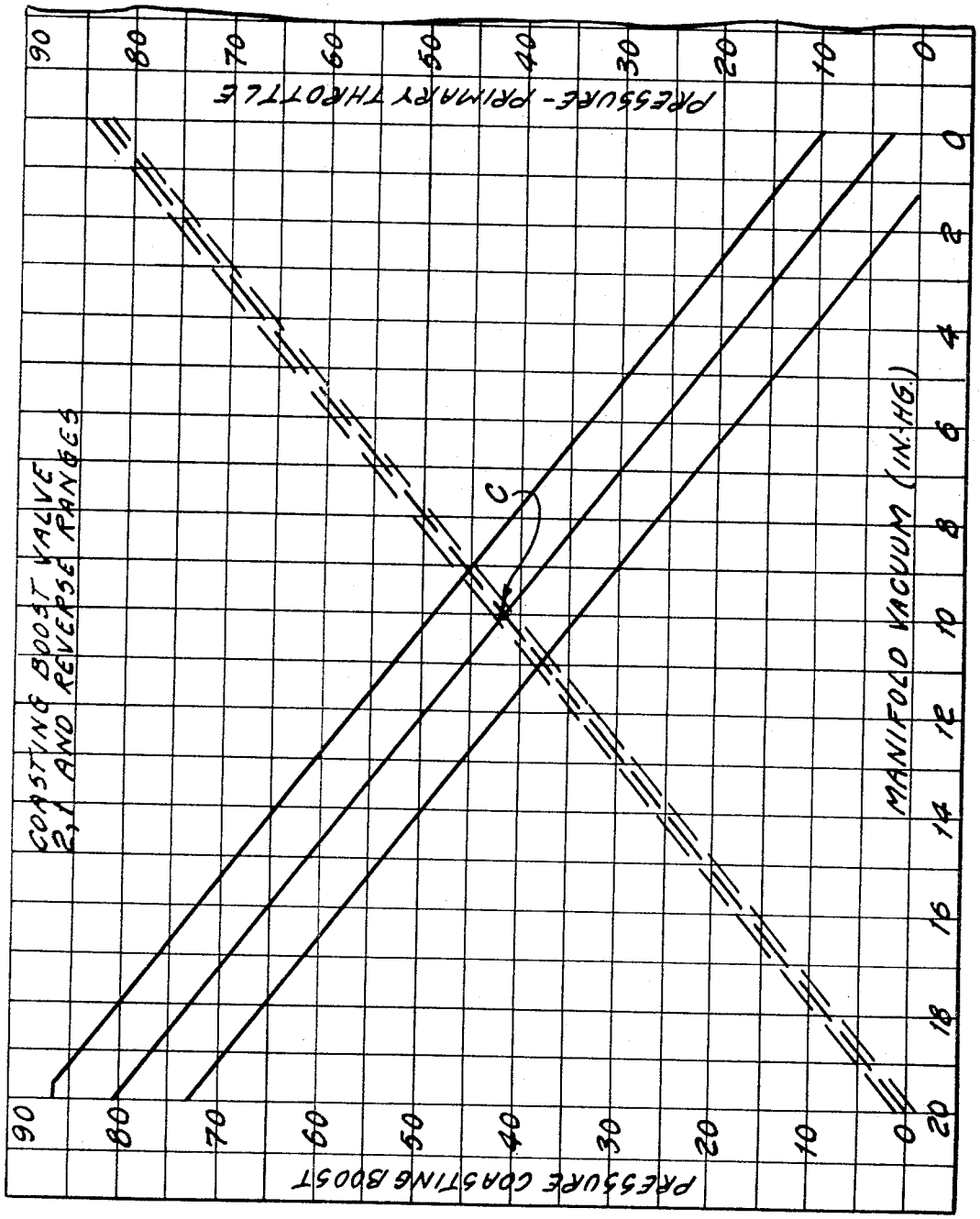
FIGURE 3 is a chart showing the variation of coasting boost pressure for the circuit of FIGURES 2A, 2B and 2C as engine manifold pressure changes.

In FIGURE 1 numeral 10 designates generally an automotive vehicle, internal combustion engine. It is provided with an air-fuel mixture carburetor 12 which supplies the combustion cylinders of the engine with a combustible mixture through an intake manifold system. The pressure in this manifold system is used as an operating variable for the transmission valve system that I will describe.

The vehicle includes road wheels 14 which are connected to the power output shaft of the transmission system through a suitable driveshaft and differential axle assembly.

The engine crankshaft is connected to the impeller 16 of a hydrokinetic torque converter 18. The impeller 16 is situated in toroidal fluid flow relationship with respect to a bladed turbine 20. A bladed stator 22 is located between the turbine flow exit and the impeller flow entrance in the usual fashion.

A stationary stator sleeve shaft 24, which is connected to the relatively stationary transmission housing, supports the stator 22. An overrunning brake 26 anchors the stator 22 to the stator shaft 24 and inhibits rotation of the stator in one direction although it accommodates freewheeling motion in the opposite direction.

The turbine 20 is connected directly to turbin shaft 28. A clutch drum 30 is connected directly to the turbine shaft 28. This drum forms a part of a multiple disc clutch assembly 32 which is engaged during forward drive operation in each of the forward drive speed ratios. It is identified in FIGURE 1 as a forward clutch.

Drum 28 carries clutch element 34 which forms a part of a multiple disc clutch assembly 36. A friction brake band 38 surrounds an outer drum portion of the clutch 36. It is identified in FIGURE 1 as the intermediate band. It is applied and released by an intermediate servo which comprises a cylinder within which is positioned a movable piston that is drivably connected to the operating end of the band 38. The piston and the cylinder cooperate to define a pair of opposed fluid pressure chambers. When both chambers are applied, the brake band is released. When the right-hand pressure chamber is exhausted and the left-hand pressure chamber is pressurized, the brake band is applied.

Forward clutch 32 includes a clutch element 40 which is connected directly to ring gear 42 of a simple planetary gear unit 44. A companion simple planetary gear unit 46 comprises a ring gear 48 and a carrier 52. This corresponds to carrier 50 of the planetary gear unit 44. Carrier 50 journals rotatably a plurality of planet pinions 54 and carrier 52 carries rotatably a plurality of planet pinions 51. Gear units 44 and 46 share a common sun gear 58.

Carrier 52 defines a brake drum about which is positioned a brake band 64. This band is applied and released by a reverse-and-low servo. The band is identified in FIGURE 1 as the manual low-and-reverse band.

The reverse-and-low servo comprises a cylinder and a piston which cooperate to define a pressure chamber. As the chamber is pressurized, the brake band is applied. A piston release spring disengages the brake band as fluid pressure is exhausted from the servo.

The sun gear 58 is drivably coupled to the clutch drum for the direct-and-reverse clutch 36 by means of a drive shell 60. This shell surrounds the gear unit 44 and the multiple disc clutch assembly 32.

Carrier 50 is connected directly to the power output shaft 62. Carrier 52 is adapted to be anchored to the relatively stationary housing of the transmission mechanism by an overrunning clutch shown in part at 66. The clutch comprises an outer race connected directly to the transmission housing, and an inner race connected to the carrier 52. Overrunning brake rollers 68 are situated between the races. One of the races is cammed to permit a camming action with the roller 68, thereby inhibiting rotation of the carrier 52 in one direction but permitting freewheeling motion in the opposite direction.

Brake 66 complements the action of the brake 64. The latter can be applied during manual low range operation and during reverse drive. When the operator desires an automatic ratio change from a low speed ratio to the intermediate speed ratio, however, overrunning brake 66 provides the sole means for accommodating torque reaction. The brake band 64 is released.

The governor valve assembly 70 is connected directly to the shaft 62. It comprises a primary governor and a secondary governor, as will be explained subsequently with reference to FIGURE 2C. This governor assembly provides a speed sensitive pressure signal that is utilized by the automatic control valve circuit.

The forward clutch is applied by a clutch servo comprising a clutch cylinder 70 in which is positioned a clutch piston 74. The cylinder and piston, which cooperate to define a pressure cavity, applies and releases the friction discs of the forward clutch. A cylinder 78 within which is positioned a piston 76, comprises a servo for the direct-and-reverse clutch. Fluid pressure can be applied to the clutch servos through feed passages, as will be explained subsequently with reference to FIGURE 2.

The front pump for supplying circuit pressure for the control valve circuit of FIGURES 2 and 3 is driven by the impeller, as indicated schematically in FIGURE 1.

To condition the mechanism for operation in the low speed range, brake band 64 is applied. Multiple disc clutch assembly 32 is applied as it is during operation in any of the forward drive speed ranges. Turbine torque, which is developed by the torque converter 18, is transferred through the turbine shaft 28 and through the engaged clutch 32 to the ring gear 42. The resistance to movement of the carrier 50 offered by the output shaft 62 causes the sun gear 58 to rotate in a backward direction relative to engine rotation. This causes ring gear 48 to rotate in the direction of rotation of the engine as the carrier 52 is anchored by the brake 64. Ring gear 48 delivers its torque directly to the shaft 62. Thus a split torque delivery path is provided, with a portion of the torque being delivered to each of the three gear units.

If continued operation in the low speed ratio is not desired, the torque reaction of the carrier 52 can be accommodated by the overrunning brake 66 rather than the brake band 64. This is the case whenever the transmission is conditioned for automatic ratio changes in the forward drive range.

To initiate a change in the speed ratio from the low speed ratio to the intermediate speed ratio, brake band 38 is applied. If brake band 64 was used during low speed ratio operation, it is released. The forward clutch 32 remains applied. Thus the sun gear 58 now becomes a reaction member as turbine torque is delivered to the ring gear 42. Torque multiplication occurs through the gear unit 44, and gear unit 46 has no function at this time.

To condition the mechanism for operation in the high speed ratio range, brake band 38 is released and clutch 36 is applied. Clutch 32, as mentioned earlier, remains applied. All the brakes are released. The clutches thus connect together the elements of the gearing for rotation in unison with a 1:1 drive ratio.

Reverse drive is achieved by disengaging the forward clutch 32 and engaging the direct-and-reverse clutch 36. At the same time the brake band 64 is applied and the brake band 38 is released. Turbine torque then is delivered from the shaft 28 and through the clutch 36 to the sun gear 58. Carrier 52 acts as a reaction member as the ring gear 48 is driven backward by the ring gears 58. The reverse motion of the ring gear 48 is imparted to the output shaft 62.

In FIGURES 2A, 2B and 2C I have shown schematically the control valve circuit for controlling the engagement and release of the clutches and brakes of the FIGURE 1 construction. The impeller driven front pump is identified in FIGURE 2 by reference character 80. It receives fluid from a transmission sump in which is situated an oil screen 82 located in the lower region of the transmisison housing. The pump delivers pressure to pump discharge passage 84 which serves as a main pressure feed passage.

A main regulator valve 86 regulates the pressure level of the pressure in the passage 84. It communicates with the passage 84 through passage 88.

The valve 86 comprises a valve chamber 90 which receives a multiple land valve spool 92. This spool, which comprises spaced valve lands 94, 96, 98 and 100, is biased in an upward direction as viewed in FIGURE 2A by a pair of valve springs 102 and 104. Spring 104 is seated on a pressure booster valve 106 which has three spaced valve lands 108, 110 and 112.

When pressure begins to develop in passage 84, it is received by the chamber 90 between lands 98 and 96. At the same time a pressure buildup occurs on the differential area defined by lands 94 and 96. After a predetermined pressure is achieved, communication is established between passage 88 and the converter feed passage 114. This supplies the torque converter 18 with charge pressure. The maximum pressure in the converter is maintained at a safe value by the presence of a converter pressure relief valve 116 which communicates with the passage 114.

The valve chamber 90 communicates also with a sump passage 118. Passage 114 is uncovered first upon a pressure buildup in the passage 84, thereby providing priority for the converter before the exhaust port 120 is uncovered by land 100. The passage 118 communicates with the port 120. Communication between passages 88 and 114 is controlled by land 98. In the absence of throttle pressure acting on the pressure booster valve 106, the regulated line pressure maintained by the valve 86 is determined by the calibration of the springs 104 and 102.

A pressure signal is distributed through the differential area defined by the lands 108 and 110 of the pressure booster valve through a passage 122. This signal, which is proportional in magnitude to the engine manifold pressure, is developed by a primary throttle valve assembly which will be described subsequently with reference to FIGURE 2C. An auxiliary pressure is distributed to the differential area defined by lands 112 and 110 on the pressure booster valve. This signal is distributed through passage 124. It is either present or absent, and it is effective when it is present to augment the cutback in the pressure signal due to the presence of a signal pressure in passage 122.

Pressure is supplied from the passage 124 by a cutback valve that will be described subsequently with reference to FIGURE 2C. The cutback valve responds to governor pressure to supply the passage 124 with primary throttle valve pressure or to exhaust the same. In this way a higher circuit pressure is made available during stall and during initial acceleration from a standing start when higher torque capacities are required by the friction torque establishing devices.

Control pressure passage 84 communicates with a passage 126 which extends directly to the driver-operated manual valve 128. This valve comprises a multiple valve element 130 slidably situated in a valve chamber 132. The valve chamber is formed with lands which register with multiple lands 134, 136, 138 and 140 located at one side of the valve element 130. It is formed with other internal valve lands that register selectively with lands 142, 144, 146, 148, 150 and 152 located on the opposite side of the valve element 130.

The various operating positions of the valve element 130 are determined by the symbols R, N, D1, 2 and L. These, respectively, correspond to the reverse range position, the neutral position, the automatic forward drive operating range position, the intermediate speed ratio range position and the low speed ratio range position. When the valve element 130 assumes the "R" position passage 154 becomes pressurized as it is brought into communication with passage 126. At that time passage 126 communicates with valve port 156 which is brought into communication with valve port 158 through valve space 160 located between lands 132 and 134. Communication between port 158 and port 162 is established at that time by valve space 164 located between lands 142 and 144. Passage 154 communicates with port 162. Passage 166 also is pressurized since it communicates with pressurized port 158.

Passage 168, which communicates with the valve opening 132 through valve port 170, is exhausted at that time through the exhaust opening on the left-hand end of the valve chamber 132 and through the communicating valve space 172 situated between the valve lands 138 and 136. Passage 174, which communicates with valve port 176 in the chamber 132, is exhausted through the left-hand end of the chamber 132 and through the communicating valve space 178 located between lands 148 and 146. Passage 174 is pressurized whenever the valve element 130 is shifted to the "2" position. Passage 168 is pressurized whenever the valve element 130 is in the "D1," the "2" or the "L" positions. Passage 154 is pressurized only when the valve element 130 is moved to the "R" position and passage 166 is pressurized only when the valve element 130 is moved to the "L" or "R" positions.

A pressure signal that is related functionally in magnitude to engine intake manifold pressure is obtained by a primary throttle valve indicated generally by reference character 180. This valve comprises a valve spool 182 situated within the valve chamber 184. The spool 182 is formed with spaced valve lands 186, 188 and 190. These lands register with cooperating internal lands in the valve chamber 184.

A control pressure passage 192 extends to the valve chamber 184 from the control pressure passage 84.

An engine manifold pressure sensitive signal, hereinafter referred to as throttle valve pressure or throttle pressure, is distributed from the valve 180 through passage 194. It communicates with the chamber 184 at a location between lands 188 and 190. The chamber 180 is provided with an exhaust port as shown at 196.

A vacuum diaphragm assembly 198 actuates the valve element 182. A flexible diaphragm 200 and a diaphragm housing 202, which comprise part of the vacuum diaphragm assembly 198, define a manifold pressure chamber 204 which communicates with the engine manifold through an engine manifold pressure passage 206. The diaphragm is urged in a left-hand direction by valve spring 208. The result of the forces due to the spring 208 and the engine manifold pressure in the chamber 204 is transmitted to the valve element 182 through a valve operating rod 210.

The manifold pressure sensitive signal in passage 194 is distributed through passage 212 to the pressure boosting valve. This pressure signal acts on the differential area of lands 110 and 108.

The magnitude of the pressure level maintained by the regulator valve 86 is dependent upon engine manifold pressure. The variation in line pressure that take place as the manifold pressure changes is indicated graphically in FIGURE 5, and more particularly by the portion of the curve indicated by label A. This comprises a line $a$ which represents the mean manifold vacuum. Lines $b$ and $c$ represent the extremes of the tolerance variation in the manifold vacuum from either the lower side or the upper side of the line $a$. This influence of the line coasting boost valve is shown by curve portion B. This will be explained more fully subsequently.

Passage 194 communicates also with cutback valve 214. This valve comprises a valve chamber 216 and a multiple land valve element 218. Element 218 is formed with spaced valve lands 220, 222 and 224 which register with internal valve lands in the chamber 216.

When the valve element 218 is positioned, as shown in FIGURE 2C, the space between lands 220 and 222 establishes communication between passage 212 and cutback pressure passage 226. When the valve element 218 moves in a downward direction, as viewed in FIGURE 2C, communication is established between passage 226 and the exhaust port 228. At the same time land 220 blocks passage 212.

Cutback pressure passage 226 communicates with accumulator valve passage 229. The cutback pressure passage 124 associated with the pressure booster valve of FIGURE 2A communicates with passage 229 through a two-way ball check valve assembly 230. Passage 229, which is pressurized by passage 226 when the cutback valve 214 assumes the position shown in FIGURE 2C, communicates with the line coasting boost valve 232. This valve comprises a valve chamber 234 within which is positioned a valve element 236 having spaced valve lands 238 and 240. Valve element 236 is biased in an upward direction, as viewed in FIGURE 2A, by a valve spring 242. The upper end of land 238 communicates with the primary throttle valve pressure passage 212, the pressure force established by the primary throttle valve pressure in that passage opposing the force of the spring 242. The diameter of land 240 is bigger than the diameter of land 236.

Passage 244 is pressurized whenever the manual valve is moved to the "2" position or the "L" position. It is exhausted in other driving modes. It communicates with the chamber 234 at a location intermediate lands 238 and 240. Passage 229 is exhausted through passage 226 and through the cutback valve whenever the cutback valve assumes a downward position, as viewed in FIGURE 2C. Thus during operation in the "2" or "L" ranges with the vehicle traveling at a speed in excess of that speed at which the cutback valve shifts in a downward direction, the line coasting boost valve 232 will produce a regulated pressure in passage 246 which is distributed to the cutback pressure passage 124 through the check valve assembly 230. At this time, of course, the ball in the check ball assembly 230 seals the exhaust flow path through the passage 226.

The chamber occupied by the spring 242 is exhausted through an exhaust port 248. The primary throttle valve pressure in passage 194 communicates with passage 250, which extends to the throttle booster valve 252. This valve comprises a valve spool 254 which has formed thereon valve lands of differential diameter as indicated 256 and 258. Valve element 254 is slidably situated in the valve chamber 260 having internal valve lands that register with the lands 256 and 258. Valve spring 262 urges the valve element 254 in a right-hand direction.

Control pressure is distributed to the valve chamber 260 through control pressure passage 264, which is connected to the main control pressure feed passage 84. Primary throttle valve pressure in passage 250 is distributed to the right-hand end of the valve element 254 and also to the valve chamber 260 at a location intermediate the lands 256 and 258. Output pressure passage 266 communicates with the valve chamber 260 also at a location between the lands 256 and 258.

When the magnitude of the pressure in passage 250 is less than a predetermined value, as determined by the calibration of the spring 262, direct communication is established between passage 250 and passage 266. As the pressure in passage 250 increases beyond a calibrated minimum value, valve element 254 tends to shift in a left-hand direction against the opposing force of spring 262. This causes an increase in the degree of communication between passage 264 and output pressure passage 266 while at the same time communication between output pressure passage 266 and primary throttle valve pressure passage 250 is decreased. This results in an augmentation of the magnitude in the output pressure signal in the passage 266. This augmented signal, hereinafter referred to as secondary throttle valve pressure, is distributed to the lower end of the cutback valve through passages 268 and 274. The presence of secondary throttle valve pressure in passage 268 delays the point at which the cutback valve shifts during acceleration from a standing start. It is intended that this delay will cause the cutback valve to shift after an automatic 1–2 upshift occurs during the acceleration period but before the automatic 2–3 upshift occurs. In this way the pressure booster valve remains active for a longer period of time and a higher circuit pressure is maintained to provide an increased torque capacity in the servos when it is needed during the early stages of the acceleration period even beyond the 1–2 upshift point.

Secondary throttle valve pressure in passage 268 is distributed also to the lower end of throttle modulator valve 270. This valve is a single diameter valve element which is received within a throttle valve chamber having internal lands that register with the single land of the valve element 270. Valve 270 is urged in a downward direction by valve spring 272.

Passage 274 is exhausted when the manual valve assumes any position other than the "2" position or the "L" position. It serves as an exhaust flow path for the throttle modulator valve. Passage 274 is exhausted through the downshift valve subsequently to be described and through passage 276, which communicates with the passage 274 through the downshift valve.

Valve 270 modulates the pressure in passage 268 to produce a modulated, reduced throttle pressure in passage 278.

A 2–3 shift valve 280 is situated in a valve bore 282 that is aligned with the valve 270. Shift valve 280 comprises a movable valve element 284 having spaced valve lands 286, 288, 290 and 292. Passage 154, which is pressurized whenever the manual valve assumes the reverse position, communicates with passage 294 which in turn communicates with the valve chamber 282 at a location intermediate lands 290 and 292. The pressure during the reverse drive operation then can be distributed through the 2–3 shift valve from passage 294 to communicating passage 296 which extends to passage 298. The direct-and-reverse clutch 36 receives control pressure from passage 298 through feed passage 300. The same pressure is distributed from passage 298 to passage 302 through one-way check valve 304. Passage 302 in turn communicates directly with the intermediate servo release pressure chamber through feed passage 306. The transmission is conditioned for reverse drive operation when the manual valve is shifted to the "R" position, at which time the 2–3 shift valve and the 1–2 shift valve, subsequently to be described, are in their respective downshift positions as indicated in FIGURES 2A and 2B.

The pressure feed passage for the 2–3 shift valve 280 is identified by reference character 308. Passage 308 receives its pressure from the 1–2 shift valve, as will be explained subsequently. Thus whenever the 1–2 shift valve is in the downshift position, passage 308 is exhausted thereby preventing distrbution of pressure to the 2–3 shift valve. The 2-3 shift valve then is inoperative even though in may move in response to pressure signals from the throttle booster valve and from the governor valve, which now will be described.

The upper end of land 286 communicates with the governor pressure passage 310, which extends to a secondary governor valve 312. This governor valve, together with the primary governor valve 314, is carried by a common governor valve body, the entire assembly being identified in FIGURE 1 by reference character 70. The assembly 70 is connected drivably to the power output shaft 62 so that the centrifugal force actuates the governor valves 312 and 314.

Control pressure is distributed to the secondary governor valve 312 through a governor feed passage 316. Valve 312 comprises a valve element with lands of differential area. The valve element is urged in a radially outward direction by the valve spring 318. The force of the spring 318 balances the pressure force acting on the valve element. The valve element modulates the pressure in passage 316 to produce a governor pressure signal in output pressure passage 310.

The radially outward end of the secondary governor valve element communicates with the primary governor valve chamber through a crossover passage 320. The primary governor valve 314 includes a radially movable valve element which blocks the passage 320 when it assumes a radially inward position. When it assumes a radially outward position, however, communication is established between passage 320 and exhaust port 322. The valve element for the primary governor valve 314 is urged radially inwardly by a valve spring 324.

When the speed of rotation of the output shaft is sufficiently high, the force of spring 324 is overcome by the centrifugal force due to the mass of the valve element for the primary governor valve 314. This will permit the secondray governor valve to modulate the pressure in passage 316. At other speeds the pressure buildup that occurs in passage 320 renders the secondary governor valve 312 inactive, and the passage 310 is in communication with exhaust port 326 of the secondary governor valve 312.

The pressure signal in passage 310 thus is an indicator of vehicle speed at any speed in excess of the speed at which the primary governor valve 324 moves radially outwardly. This speed signal is distributed through passage 310 to the upper end of the valve land 286 to urge the 2-3 shift valve normally to an upshift position against the opposing influence of the secondary throttle valve pressure.

The pressure in passage 310 acts also on the other end of the cutback valve so that the cutback valve will respond to an increase in road speed to reduce the magnitude of the circuit pressure made available to the servos after a 1-2 upshift occurs.

When the 2-3 shift valve element 284 assumes the position shown, communication is established between passage 296 and the exhaust region through exhausted passage 294. As mentioned earlier, this passage is exhausted whenever the manual valve assumes any position other than the reverse position. This causes the reverse-and-direct clutch and the release side of the intermediae servo to become exhausted. When the 2-3 shift valve moves to the upshift position, land 290 blocks communication between passages 294 and 296. At the same time communication is established between passage 296 and feed passage 308. This allows pressure distribution to the reverse-and-direct clutch and to the release side of the intermediate servo. The apply side of the intermediate servo is pressurized through passage 324 at that time. This passage communicates with control pressure passage 326 through the 2-3 backout valve, which will be described subsequently. Passage 326 in turn communicates with the feed passage 308. When both sides of the intermediate servo are pressurized, the servo assumes a release position. When the release side of the intermediate servo is exhausted, the servo is applied.

The feed passage for the 2-3 shift valve, as shown at 308, communicates with passage 326 which extends to the 1-2 shift valve identified generally by reference character 328. This includes a valve element 330 having spaced valve lands 332, 334, 336, 338 and 340. A separate valve element, which forms a part of the 1-2 shift valve assembly, is located on the upper end of the valve element 330. It comprises a pair of valve lands 342 and 344 of differential area. It is adapted to engage valve element 330, but it is not connected directly to it. The lands of valve 330 register with internal valve lands formed in the valve chamber 342 for the 1-2 shift valve assembly.

When the valve element 330 assumes the downshift position shown in FIGURE 2A, communication is established between passage 326 and exhaust port 343. Modulated secondary throttle pressure is distributed to a differential area defined by lands 342 and 344. This supplements the force of valve spring 346 to maintain the valve assembly in a downshift position. The force of the spring 346 and the modulated secondary throttle pressure force is opposed by the force of the governor pressure in passage 310, which acts on the upper end of land 342.

When the valve element 330 assumes an upshift position, communication is established between passage 326 and control pressure passage 168, which is pressurized, as mentioned earlier, whenever the manual valve is shifted to the "D1," "2" or the "L" positions. Communication between passage 326 and exhaust port 343 is interrupted and communication between passage 348 and the exhaust port 343 is established. Passage 348 extends to the low-and-reserve servo.

When the valve element 330 assumes the downshift position shown in FIGURE 2A, communication is established between passage 166 and passage 348, thereby causing the low-and-reserve servo to become applied. This occurs, however, only when the manual valve is moved to the "L" or the "R" positions since only at that time is the passage 166 pressurized. It is exhausted at other times.

When an upshift occurs for the valve element 330, the differential area defined by lands 340 and 338 become exhausted through the exhausted passage 348. This introduces a so-called snap action that eliminates hunting of valve element 330 between the upshift and the downshift positions.

The diameter of land 332 is slightly greater than the diameter of land 334. When the valve element 330 is in the upshift position, the differential area defined by these lands is subjected to a pressure force due to the existence of pressure in passage 166 when the manual valve element is shifted to the "L" or "R" positions. At other times this passage 166 is exhausted. When the vehicle is operating at a relatively high road speed and the manual valve is shifted to the "L" position, the existence of the pressure on the differential area of lands 332 and 334 establishes a proper shift point as the vehicle speed is reduced to a value that will make it possible for an automatic downshift from the intermediate speed ratio to the low speed ratio.

A change in engine throttle position under these conditions will cause a change in circuit pressure for the reason previously described. That is, the pressure booster valve normally would tend to decrease the circuit pressure because it is sensitive to changes in manifold pressure as the engine carburetor throttle setting changes. But in order to maintain a relatively constant 2-1 downshift point regardless of changes in the engine throttle setting, it is necessary to modify the pressure acting on the 1-2 shift valve and D2 valve assembly. This is done by means of the downshift valve 350. This valve communicates with a high pressure region of the circuit through passage 274. In this embodiment the high pressure region is passage 360 and passage 166, which are pressurized during "L" operation and "R" operation.

The downshift valve comprises an adjustable valve element 352 having a pair of spaced valve lands 354 and 356. The diameter of land 356 is greater than the diameter of land 354. Element 352 is situated in the valve chamber 358. Passage 276 communicates with the valve chamber at a location intermediate the lands 354 and 356. This passage communicates also with a passage 360 which is pressurized with the pressure in passage 166. This is because of the fact that passage 166 communicates with passage 360 through the two-way check valve assembly 362. The check valve assembly seals passage 364 under these conditions. Passage 364 communicates with passage 174, which is exhausted at all times except when the manual valve assumes the 2 position.

Valve element 352 is urged in a left-hand direction, as viewed in FIGURE 2B, by a valve spring 366. Primary throttle valve pressure is distributed to valve chamber 358 through passage 368. Passage 360, which is exhausted when the manual valve assumes any position other than the "L" or "R" positions, is in communication with passage 274 through the downshift valve chamber 358. As mentioned earlier, however, passage 166, passage 276 and passage 360 are pressurized with line pressure when the manual valve assumes the "L" or "R" positions. This will cause the downshift valve to regulate the pressure in passage 276 to produce a resultant modified pressure in passage 274. This modified pressure is transferred to the differential area of lands 342 and 344, thereby establishing the proper 2–1 downshift point.

The downshift valve 350 is connected mechanically to the engine carburetor throttle. When the engine carburetor throttle is moved to a fully wide-open position, the valve element 352 is shifted mechanically in a right-hand direction, thereby connecting passage 368 with passage 274. At that time the magnitude of the pressure in passage 368 is substantially equal to control pressure. Thus both shift valves are urged toward a downshift position, thereby tending to overrule the automatic shifting tendencies. The downshifting forces, however, are not sufficient to move the shift valves to their respective downshift positions at speeds greater than precalibrated road speeds.

The intermediate servo apply chamber can be engaged through passage 324 with 2–3 backout valve 370. This valve is similar to the one described in U.S. Patent No. 3,295,387 and will not be described in particular here. It is effective to cushion the application of the high speed ratio clutch when the transmission shifts from the intermediate speed ratio to the high speed ratio during coasting or minimum engine throttle operation. It does this by providing controlled communication between the direct drive clutch and the apply side of the intermediate servo when the 2–3 shift valve moves to the upshift position. The valve moves at that time in a downward direction against the opposing force of valve spring 372 as the pressure buildup occurs on the upper end of the valve. This pressure buildup occurs on the upper end of the valve. This pressure is distributed to the valve through passage 298 which is equal to the direct clutch pressure at any given instant during the shift interval. The 2–3 backout valve is sensitive also to secondary throttle valve pressure so that the degree of accumulation or cushioning action provided by it is dependent upon the magnitude of the secondary throttle valve pressure. The lower end of the 2–3 backout valve communicates with secondary throttle valve pressure passage 266 through the crossover passage 374.

The function of the 2–3 backout valve is overruled by the manual low valve 376, which normally is in the inactive position shown in FIGURE 2C. When the manual valve is shifted to the "L" position, however, passage 276, which communicates with the lower end of the manual low valve, is pressurized thereby shifting the 2–3 backout valve and the manual low valve in unison to the upward position.

Passage 174 communicates directly with the 1–2 shift valve assembly at a location intermediate the land 344 and 332. Thus whenever the manual valve is forced to the upshift 2 position, the 1–2 shift valve is forced to the upshift position. Passsage 168, which is pressurized during operation in all forward ranges, then is brought into communication with passage 326 which causes the apply side of the intermediate servo to become pressurized. In this way the operator can select the intermediate speed ratio, and the transmission will remain in that ratio until the operator moves the manual valve from the "2" position to some other position. The operation of the 2–3 shift valve is overruled when the 1–2 shift valve is downshifted since the 1–2 shift valve will then interrupt distribution of control pressure to passage 308. Selection of the second speed ratio then can be made by the 2–3 shift valve rather than by the manual valve. It is possible, therefore, for the operator to be assured of a proper manual ratio change to the intermediate ratio without pressure distribution to the high speed ratio clutch regardless of whether the manual valve is shift to a position intermediate the "D1" range position and the "2" position. If leakage should occur across the manual valve lands when the manual valve is positioned inadvertently between the "D1" and "2" positions, the pressure that is thus bypassed will not be routed to the high speed ratio clutch.

When the manual valve is shifted to the "L" position, pasage 166 becomes pressurized as mentioned earlier. The 1–2 shift valve under these conditions establishes communication between passages 166 and 348. The same control pressure is admitted to passage 348 and to the lower end of the 1–2 shift valve to maintain it in the position shown in FIGURE 2A. Thus the low speed servo becomes applied and operation in that ratio will continue until the operator again moves the manual valve to some position other than the "L" position.

When the operator shifts the manual valve to the "D1" position, passage 166 is exhausted. The 1–2 shift valve is exhausted. The 1–2 shift valve is free to move to the upshift position when the road speed is sufficient to cause this to occur automatically. Thus the operator can control the drive range in which he chooses to operate. He can either shift to the "D1" position and make the transmission conditioned for automatic upshifts and downshifts in the usual fashion, or he can select either continuous operation in the intermediate speed ratio range or continuous operation in the low speed ratio range.

The intermediate band accumulator valve 380 is situated between the passage 302, which extends to the intermediate servo release chamber, and the passage 382 which is exhausted through the exhausted passage 294 and through the 2–3 shift valve. The accumulator valve is provided with a differential area on which the accumulator pressure on the release side of the intermediate servo is allowed to act. This buildup in pressure during accumulation in the intermediate servo creates a force on the accumulator valve element that is opposed by valve spring 384.

The force of the spring 384 is supplemented by a pressure force acting on a valve plunger 386 situated in the upper end of the valve assembly 380. The valve plunger 386 is subjected to the cutback pressure in passage 229.

Since cutback pressure exists in passage 229 until the instant that the cutback valve is shifted, as explained previously, the cutback occurs after the 1–2 upshift. Accumulating action of the accumulator valve 380 is augmented during automatic 1–2 upshifts as well as 3–2 downshifts. The magnitude of the augmentation depends, of course, upon the magnitude of the primary throttle valve pressure made available to passage 229. When the throttle valve pressure is high, it is not necessary for the intermediate servo accumulator to develop a higher pressure on the release side of the servo before the accumulator piston begins to stroke to the "off" position.

When the vehicle is coasting with the manual valve in the "L" position, control pressure is made available to passage 124. This is due to the fact that passage 166 is brought into communication with passage 244 through the 3–2 check valve 362 at that time. Similarly, control pressure is made available to passage 244 whenever the manual valve assumes the "2" position. This is due to the fact that communication is established at that time between passage 174 and passage 244 through the two-way check valve 362. Due to the differential area of lands 238 and 240 on the line coasting boost valve, the valve element 236 will be caused to modulate thus producing a regulated pressure in passage 124 during coasting with the manual valve in either the "L" position or the "2" position. This regulated pressure, as explained previously, augments the circuit pressure to maintain clutch and brake capacity during coasting.

If there is a complete absence of primary throttle valve pressure acting on the upper end of the valve element 236, the spring 242 will maintain a constant regulated line pressure of a minimum value, which in one operating embodiment is 81 p.s.i. It is desirable, however, to maintain a constant 2–1 downshift point when the manual valve is shifted to the "L" position as coasting continues, regardless of changes in primary throttle valve pressure. This is accomplished by allowing the primary throttle valve pressure to influence the calibration of the line coasting boost valve.

The result of an increase in primary throttle valve pressure during coasting is an opposition to the influence of the valve spring 242. This reduces the response of the regulator valve to changes in primary throttle valve pressure. This occurs in spite of the presence of the pressure boost due to the existence of pressure in passage 122 and the force produced by that pressure on the differential area of lands 108 and 110.

Figure 5:
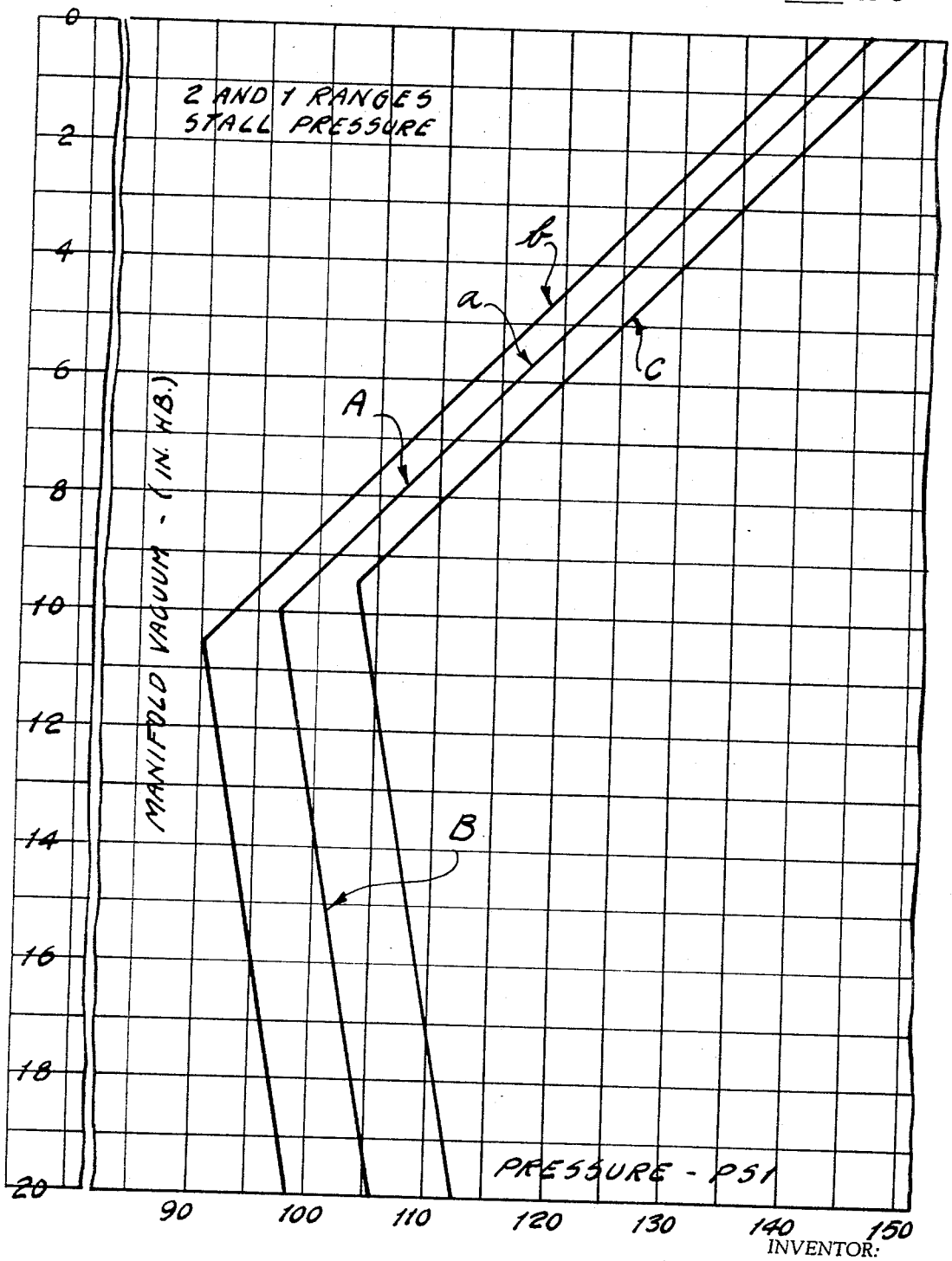
FIGURE 5 shows a variation in the stall pressures that are available for various manifold pressures when the transmission is conditioned for intermediate speed ratio operation and low range operation.

The influence of the pressure decay produced by line coasting boost valve 232 is greater than the opposing influence of the primary throttle valve pressure in passage 122 on the calibration of the main regulator valve. Because of this, the pressure variation shown in FIGURE 5 is a so-called "pressure decay" in the region of the curve represented by reference character B. This decay continues until the regulating action of the line coasting boost valve is overcome by the primary throttle valve pressure upon continued increases in the magnitude of the primary throttle valve pressure. At that time the line pressure variation illustrated in FIGURE 5 is represented by the portion of the curve shown at A. The transition from the curve portion B to the curve portion A is characterized by a sharp breakpoint.

If it were not for the influence of the primary throttle valve pressure on the line coasting boost valve, the line pressure would vary from a value of approximately 105 p.s.i. with 20″ of manifold vacuum to a maximum value of 145 p.s.i. if the manifold vacuum were zero. The variation, of course, would be a straight line between these two points. This would result in an excessive line pressure at any intermediate manifold vacuum. This in turn would result in an unduly harsh shift and excessive circuit pressure. The calibration of the circuit would be adversely influenced.

Point C in FIGURE 3 represents the point at which the regulating action of the line coasting boost valve ceases as the primary throttle valve pressure increases upon a decrease in manifold vacuum. Thereafter, the coasting boost pressure will rise beginning at the point C upon continued decreases in manifold vacuum. In the particular embodiment shown, this transition occurs at 10″ of vacuum. During a change in manifold vacuum from 20″ to 10″, the coasting boost pressure decreases.

FIGURE 6 shows the shift point represented as output shaft r.p.m. for each value of manifold pressure expressed in inches of mercury. The curve of FIGURE 6 shows the 2–1 manual low, closed throttle downshifts. Actually the curve in FIGURE 6 shows a slight decrease in the shift points rather than an increase. Were it not for the "washout" characteristic of the line coasting boost valve, however, the shift points would rise with changes in primary throttle valve pressure. At the righthand end of each of the curves in FIGURE 6, the variation breaks sharply. At this point the line coasting boost valve ceases to regulate and the variation in shift point then has a positive slope. If the cutback valve moves to the upper position during coasting, the shift point curve will jump abruptly from one point to the other along a vertical line. For example, if the shift point curve D is being followed and if the cutback valve moves at point E, the shift points thereafter will be represented by curve F upon continued changes in engine manifold pressure.

Figure 4:
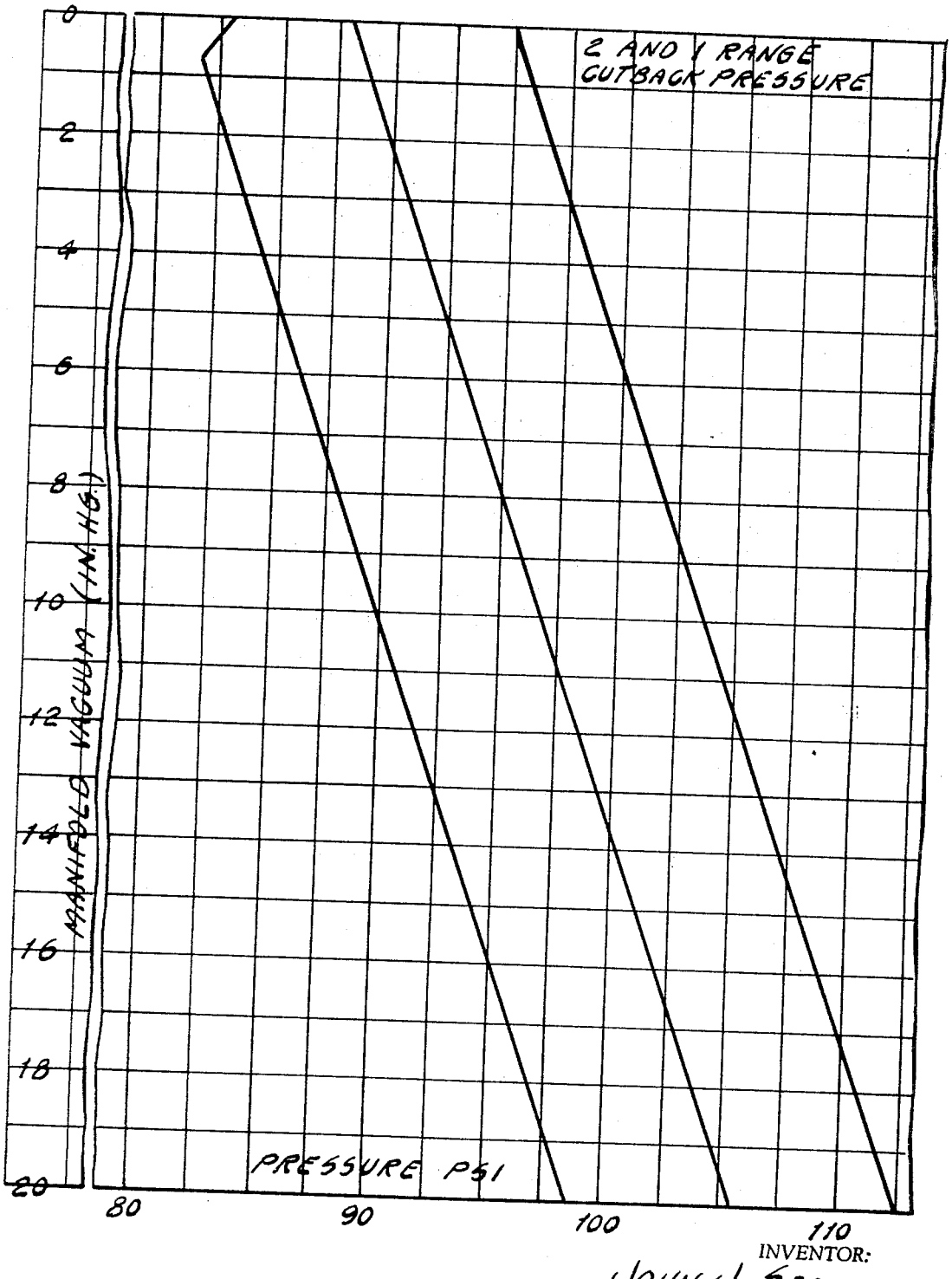
FIGURE 4 is a chart showing the variation in the circuit pressure due to the control pressure cutback that occurs during operation in the intermediate speed range and the low speed range.

In FIGURE 4 I have plotted the cutback pressure that exists for various engine manifold pressures. This curve is the result of the influence of primary throttle pressure acting on the differential area of lands 108 and 110 of the pressure booster valve and the influence of the decaying cutback valve output pressure acting on the land 112 of the pressure booster valve. The regulated output pressure of the downshift valve and the influence of the primary throttle pressure sensitive coasting boost valve establish a desired 2–1 downshift point during coasting with the manual valve in the low speed ratio position.

Semiautomatic ratio changes can be accomplished by the vehicle operator by appropriately positioning the manual valve, as explained previously. By adjusting the manual valve in this fashion, the shift ratios that are maintained by the vehicle operator are obtained by imposing driving conditions on the shift valves which in turn respond automatically to operating variables. The manual valve does not impose its requirements directly upon the servos.

When the manual valve is in the "L" position, passage 166 is pressurized. This causes the 1–2 shift valve to be held in the low speed ratio position because the lower end of land 340 is pressurized. At that time the 2–3 shift valve feed passage 308 is exhausted through the exhause port 343 in the 1–2 shift valve. This renders the 2–3 shift valve incapable of causing a ratio change.

When the manual valve is moved to the "2" position, passage 174 is pressurized. Pressure then is distributed from passage 174 through the two-way check valve 362 to the passage 360, and pressure then is distributed directly from passage 360 to the differential area of the 2–3 shift valve lands 286 and 288. This urges the 2–3 shift valve to the position shown in FIGURE 2B. At the same time pressure is distributed from passage 174 to the upper end of land 332 which shifts the 2–3 shift valve to the upshift position.

Passage 168, as explained previously, is pressurized at all times during forward drive operation and the forward clutch thus is pressurized in each forward drive range.

To accomplish a 2–3 upshift, the manual valve is shifted so that pressure is distributed only to the passage 168 as passage 174 becomes exhausted. Thus the force on the differential area of lands 286 and 288 is relieved, thereby permitting the 2–3 shift valve to shift automatically in response to changing operating variables.

Having thus described a preferred form of my invention, what I claim and desire to secure by U.S. Letters Patent is:

1. In a multiple ratio power transmission mechanism for delivering power from a driving member to a driven member, gear elements for establishing torque delivery paths between said driving member and said driven member, fluid pressure operated servos for controlling relative motion for said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said circuit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, and a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals.

2. A multiple speed ratio power transmission mechanism comprising a driving member, a driven member, gear elements, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal pressure distribution function, said manual valve having a third position in which it is adapted to interrupt distribution of shift inhibiting pressure to said distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to driven speed of said driven member, passages connecting each of said signal sources to said distributor valves for establishing normal upshifting and downshifting tendencies thereof when the inhibiting pressure forces imposed thereon by said manual valve are interrupted.

3. In a multiple ratio power transmission mechanism for delivering power from a driving member to a driven member, gear elements for establishing torque delivery paths between said driving member and said driven member, fluid pressure operated servos for controlling the relative motion of said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said conduit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals, and a downshift control valve means situated in said conduit structure including a downshift pressure passage extending from a high pressure region of said conduit structure to said first distributor valve means for imposing on the latter and downshifting tendency, said downshift control valve means communicating with said downshift pressure passage for modulating the pressure therein to produce a delayed 2–1 downshift upon a decrease in the magnitude of said second pressure signal.

4. A multiple speed ratio power transmission mechanism comprising a driving member, a driven member, gear elements, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal pressure distribution function, said manual valve having a third position in which it is adapted to interrupt distribution of shift inhibiting pressure to sad distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to the driven speed of said driven member, passages connecting each of said signal sources to said distributor valves for establishing normal upshifting and downshifting tendencies thereof when the inhibiting pressure forces imposed thereon by said manual valve are interrupted, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal.

5. In a multiple ratio power transmission mechanism for delivering power from a driving member to a driven member, gear elements for establishing torque delivery paths between said driving member and said driven member, fluid pressure operated servos for controlling the relative motion of said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said conduit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, and means for manually overruling the operation of said downshift control valve means by distributing pressure to said first distributor valve means to force the latter to a downshift position.

6. A multiple speed ratio power transmission mechanism comprising a driving member, a driven member, gear element, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal perssure distribution function, said manual valve having a third position in which it is adapted to interrupt distribution of shift inhibiting pressure to said distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to the driven speed of said driven member, passages connecting each of said signal sources to said distributor valves for establishing normal upshifting and downshifting tendencies thereof when the inhibiting pressure forces imposed thereon by said manual valve are interrupted, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, and means for manually overruling the operation of said downshift control valve means by distributing pressure to said first distributor valve means to force the latter to a downshift position.

7. In a power transmission mechanism for delivering torque from a driving member to a driven member, a plurality of gear elements, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requirements of said gear elements, a source of a second pressure signal that is proportional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establish a modified pressure in said boost valve passage, a pair of pressure distributor valve means in said conduit structure for providing selected pressure distribution to said servos to initiate ratio changes, manual valve means in said conduit structure between said pressure source and each of said distributor valve means for effecting selective distribution to the latter whereby said servos are conditioned selectively for operation only in an underdrive ratio and for operation in a full range of ratios as said manual valve is moved between a first position and second position respectively, a coasting boost valve passage connecting said coasting boost valve and said manual valve when the latter assumes said first position, pressure distribution through said boost valve being interrupted when said manual valve assumes said second position, said first pressure signal source being connected to said boost valve for overruling the regulating action of said boost valve as the magnitude of said first pressure signal increases, and spring means for opposing the force of said first pressure signal on said boost valve.

8. In a power transmission mechanism for delivering torque from a driving member to a driven member, a plurality of gear elements, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requirements of said gear elements, a source of a second pressure signal that is proportional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establish a modified pressure in said boost valve passage, and a connection between said first pressure signal source and said line coasting boost valve whereby said first pressure signal opposes the regulating action of said line coasting boost valve to modify the boost valve pressure made available to said main regulator valve means upon a change in the magnitude of said first pressure signal, said boost valve having a pressure distributing connection between it and the servo associated with an underdrive condition of said gear elements, a pressure area on said boost valve in communication with said pressure distributing connection, a spring opposing the pressure force on said pressure area, the force produced by said pressure signal opposing the force of said spring.

9. In a power transmission mechanism for delivering torque from a driving member to a driven member, a plurality of gear elements, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requirements of said gear elements, a source of a second pressure signal that is proportional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establishing a modified pressure in said boost valve passage, and a connection between said first pressure signal source and said line coasting boost valve whereby said first pressure signal opposes the regulating action of said line coasting boost valve to modify the boost valve pressure made available to said main regulator valve means upon a change in the magnitude of said first pressure signal, said line coasting boost valve being adapted to produce a reduced boost valve pressure made available to said regulator valve means upon an increase in the magnitude of said first pressure signal, said boost valve having a pressure distributing connection between it and the servo associated with an underdrive condition of said gear elements, a pressure area on said boost valve in communication with said pressure distributing connection, a spring opposing the pressure force on said pressure area, the force produced by said pressure signal opposing the force of said spring.

10. In a multiple ratio power transmission mechanism for delivering power from a driving member to a driven member, gear elements for establishing torque delivery paths between said driving member and said driven member, fluid pressure operated servos for controlling the relative motion of said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said conduit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

11. A multiple speed ratio power transmission mechanism comprising a driving member, a driven member, gear elements, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal pressure distribution function, said manual valve having a third position in which it is adapted to interrupt distribution of shift inhibiting pressure to said distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to the driven speed of said driven member, passages connecting each of said signal sources to said distributor valves for establishing normal upshifting and downshifting tendencies thereof when the inhibiting pressure forces imposed thereon by said manual valve are interrupted, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

12. In a multiple ratio power transmission mechanism for delivering power from a driving member to a driven member, gear elements for establishing torque delivery paths between said driving member and said driven member, fluid pressure operated servos for controlling the relative motion of said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said conduit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

13. A multiple speed ratio power transmission mechanism comprising a driving member, a driven member, gear elements, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal pressure distribution function, said manual valve having a third position in which it is adapted to interrupt distribution of shift inhibiting pressure to said distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to the driven speed of said driven member, passages connecting each of said signal sources to said distributor valves for establishing normal upshifting and downshifting tendencies thereof when the inhibiting pressure forces imposed thereon by said manual valve are interrupted, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

14. In a multiple ratio power transmission mechanism for delivering power from a driving member to a driven member, gear elements for establishing torque delivery paths between said driving member and said driven member, fluid pressure operated servos for controlling the relative motion of said gear elements, a fluid pressure source, conduit structure interconnecting said pressure source and said servos, a pair of fluid pressure distributor valves situated in and partly defining said conduit structure, a first source of a pressure signal that is proportional in magnitude to the torque requirements imposed on said gear elements, a second source of a pressure signal that is proportional in magnitude to the driven speed of said driven member, said conduit structure including branch portions extending from said second pressure signal source to said distributor valves for imposing on the latter ratio upshifting tendencies, each distributor valve being adapted to control selectively the pressure distribution to said servos as they are shifted between an upshift position and a downshift position, means for distributing said first pressure signal to each of said distributor valves for opposing the influence of said second pressure signal, a multiple position manual valve located in said conduit structure between said distributor valves and said pressure source, said manual valve being adapted to direct fluid pressure through said conduit structure to a first distributor valve and through said first distributor valve to a first servo to establish a low speed ratio condition, said first distributor valve being situated between said pressure source and the other distributor valve whereby the latter is supplied with fluid pressure when said first distributor valve assumes an upshift position, said other distributor valve defining in part a fluid connection through said conduit structure between said pressure source and a second of said servos to establish a higher speed ratio condition when it assumes an upshift position, an auxiliary passage in said conduit structure connecting said manual valve and said first distributor valve when the manual valve assumes a first position to inhibit the automatic upshifting tendencies of said first distributor valve, said auxiliary passage being exhausted when said manual valve assumes a second position, a second auxiliary passage extending from said manual valve to said second distributor valve for pressure loading the latter when said manual valve assumes said second position whereby automatic upshifting tendencies of said second distributor valve are inhibited, said manual valve being adapted to assume a third position whereby it interrupts shift inhibiting tendencies to permit automatic operation of said distributor valves in response to changes in said pressure signals, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, means for manually overruling the operation of said downshaft valve means by distributing pressure to said distributor valve means to force the latter to a downshift position, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

15. A multiple speed ratio power transmission mechanism comprising a driving member, a driven member, gear elements, clutch and brake means for controlling the relative motion of said gear elements to establish a series of torque multiplication ratios, servos for controlling the application and release of said clutch and brake means, a fluid pressure source, conduit structure connecting said servos and said pressure source, first and second distributor valves situated in and partly defining said conduit structure for controlling distribution of pressure selectively to said servos to initiate ratio changes, a manual valve situated between said pressure source and said distributor valves in said conduit structure, said manual valve having a first position which adapts it to distribute pressure from said source to said first distributor valve and through said first distributor valve to a first servo to condition said mechanism for low speed ratio operation, a hydraulic connection between said distributor valves whereby said second distributor valve is supplied with fluid through said first distributor valve, said manual valve having a second position in which it is adapted to distribute pressure to said first distributor valve to force it to an upshift position and to said second shift valve to force it to a downshift position whereby said mechanism is conditioned for intermediate speed ratio operation as said distributor valves are inhibited from establishing their normal pressure distribution function, said manual valve having a third position in which it is adapted to interrupt distribution of shift inhibiting pressure to said distributor valves whereby each distributor valve is adapted to function in a normal fashion to provide pressure distribution to said servos as they are shifted between an upshift position and a downshift position, a source of a first pressure signal that is proportional in magnitude to the torque delivery requirements of said gear elements, a source of a second pressure signal that is proportional in magnitude to the driven speed of said driven member, passages connecting each of said signal sources to said distributor valves for establishing normal upshifting and downshifting tendencies thereof when the inhibiting pressure forces imposed thereon by said manual valve are interrupted, a downshift control valve means situated in said conduit structure including a downshift pressure passage extending from a high pressure region of said conduit structure to said first distributor valve means for imposing on the latter a downshifting tendency, said downshift control valve means communicating with said downshift pressure passage for modulating the pressure therein to produce a delayed 2–1 downshift upon a decrease in the magnitude of said second pressure signal, means for manually overruling the operation of said downshift valve means by distributing pressure to said distributor valve means to force the latter to a downshift position, a main regulator valve communicating with said pressure source for establishing in said conduit structure a regulated line pressure of predetermined value, a fluid connection between said first pressure signal source and said regulator valve for increasing the magnitude of the regulated line pressure in response to an increase in the torque requirements of said gear elements, an auxiliary passage situated between said pressure source and said regulator valve, a line pressure coasting boost valve in said auxiliary passage, and a fluid connection between said first pressure signal source and said coasting boost valve whereby the latter responds to a decrease in the magnitude of said first signal to produce an augmentation in the magnitude of the regulated line pressure in said conduit structure.

16. In a power transmission mechanism for delivering torque from a driving member to a driven member, a plurality of gear elemnts, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requiremnts of said gear elements, a source of a second pressure signal that is proprotional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establish a modified pressure in said boost valve passage, a throttle booster valve means for modifying the magnitude of the pressure signal made available to said distributor valve means by said first pressure signal source, and means for distributing the output pressure signal of said booster valve means to said cutback valve for opposing the shifting tendencies of said second pressure signal on said cutback valve.

17. In a power transmission mechanism for delivering torque from a driving member to a driven member, a plurality of gear elements, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requirements of said gear elements, a source of a second pressure signal that is proportional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establish a modified pressure in said boost valve passage, a connection between said first pressure signal source and said line coasting boost valve whereby said first pressure signal opposes the regulating action of said line coasting boost valve to modify the boost valve pressure made available to said main regulator valve means upon a change in the magnitude of said first pressure signal, a throttle booster valve means for modifying the magnitude of the pressure signal made available to said distributor valve means by said first pressure signal source, and means for distributing the output pressure signal of said booster valve means to said cutback valve means for opposing the shifting tendencies of said second pressure signal on said cutback valve.

18. In a power transmission mechanism for delivering torque from a driving member to a driven member, a plurality of gear elements, clutch and brake means for controlling the relative motion of said gear elements, fluid pressure operated servos for engaging and releasing said clutch and brake means, a pressure source, a conduit structure connecting said servos to said pressure source, a fluid pressure regulator valve means for regulating the pressure made available by said source to said servos, a source of a first pressure signal that is proportional in magnitude to the torque requirements of said gear elements, a source of a second pressure signal that is proportional in magnitude to the driven speed of said driven member, cutback valve means communicating with said conduit structure including a branch passage extending from said first pressure signal source to said regulator valve, a cutback valve in said passage for controlling distribution of said first pressure signal to said regulator valve, said cutback valve being in fluid communication with said second pressure signal source whereby it functions in response to an increase in the speed of said driven member to effect a decrease in the regulated line pressure when the driven speed exceeds a calibrated value, a line pressure coasting boost valve communicating with said conduit structure and including a boost valve passage extending to said regulator valve for imposing on the latter an auxiliary pressure signal to augment the regulated line pressure, a connection between said pressure source and said line coasting boost valve, the latter regulating the pressure made available to it to establish a modified pressure in said boost valve passage, a connection between said first pressure signal source and said line coasting boost valve whereby said first pressure signal opposes the regulating action of said line coasting boost valve to modify the boost valve pressure made available to said main regulator valve means upon a change in the magnitude of said first pressure signal, said line coasting boost valve being adapted to produce a reduced boost valve pressure made available to said regulator valve means upon an increase in the magnitude of said first pressure signal, a throttle booster valve means for modifying the magnitude of the pressure signal made available to said distributor valve means by said first pressure signal source, and means for distributing the output pressure signal of said booster valve means to said cutback valve means for opposing the shifting tendencies of said second pressure signal on said cutback valve.

References Cited

UNITED STATES PATENTS

| | | | |
|---|---|---|---|
| 3,056,313 | 10/1962 | Lindsay | 74—752 |
| 3,118,320 | 1/1964 | Ivey | 74—869 |
| 3,309,939 | 3/1967 | Pierce | 74—869 |
| 3,310,991 | 3/1967 | Leonard | 74—869 |

DONLEY J. STOCKING, *Primary Examiner.*

T. C. PERRY, *Assistant Examiner.*

U.S. Cl. X.R.

192—109

UNITED STATES PATENT OFFICE
CERTIFICATE OF CORRECTION

Patent No. 3,446,098                            May 27, 1969

John J. Searles

It is certified that error appears in the above identified patent and that said Letters Patent are hereby corrected as shown below:

Column 26, lines 30 and 69, and column 27, line 38, after "structure", each occurrence, insert -- including pressure distributor valve means for --.

Signed and sealed this 3rd day of November 1970.

(SEAL)
Attest:

Edward M. Fletcher, Jr.

Attesting Officer

WILLIAM E. SCHUYLER, JR.

Commissioner of Patents